March 11, 1941.    I. KITROSER    2,234,410
PHOTOGRAPHIC CAMERA
Original Filed April 21, 1937    2 Sheets-Sheet 1

Inventor:
Isaac Kitroser,
Attorneys

March 11, 1941. I. KITROSER 2,234,410
PHOTOGRAPHIC CAMERA
Original Filed April 21, 1937  2 Sheets-Sheet 2
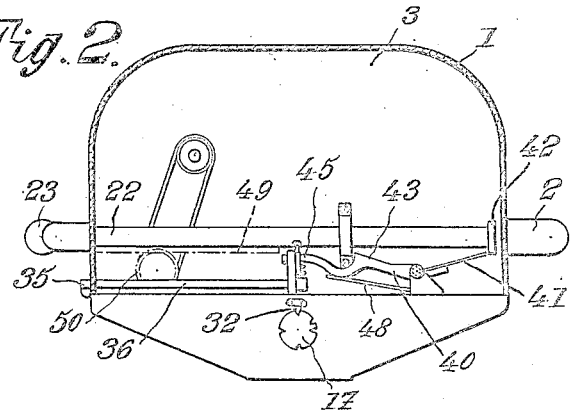
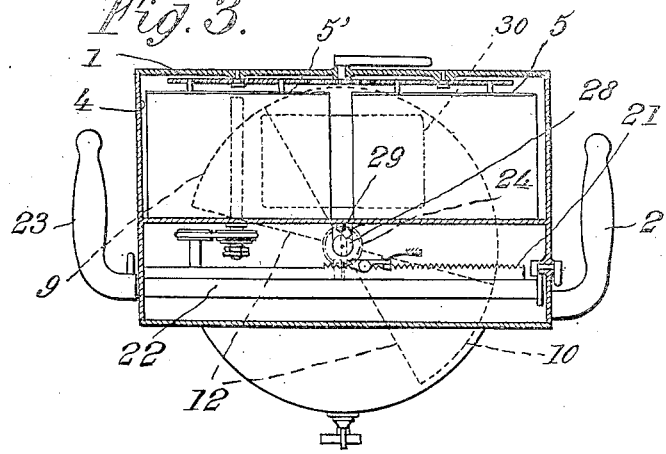
Inventor:
Isaac Kitroser,
Bailey & Carson
Attorneys Patented Mar. 11, 1941

2,234,410

UNITED STATES PATENT OFFICE 2,234,410

PHOTOGRAPHIC CAMERA

Isaac Kitroser, Viroflay, France, assignor to Société Bronzavia, Courbevoie, Seine, France, a society of France Original application April 21, 1937, Serial No. 138,254. Divided and this application October 11, 1938, Serial No. 234,440. In Belgium April 25, 1936

5 Claims. (Cl. 88—16)

The present invention relates to photographic cameras and especially, although not exclusively, those to be used on board of airplanes and other aircrafts. These cameras include, in the usual manner, at least one optical system, with a shutter device and a device for producing the displacement of the sensitized layer element, such for instance as a photographic film.

According to an essential feature of the present invention, I combine, with the arrangement above mentioned, means for controlling the working of the device for producing the displacement of the film or the like, these means being adapted automatically to ensure the suitable order of these displacements of the film or the like.

In an embodiment of my invention, I provide a locking mechanism combined with the above mentioned devices.

Other features of the present invention will result from the following detailed description of some specific embodiments thereof.

Preferred embodiments of the present invention will be hereinafter described, with reference to the accompanying drawings, given merely by way of example, and in which:

Fig. 2 shows, separately, and on a smaller scale, the release means to be used in combination with this camera, according to a feature of the present invention;

Fig. 3 is a sectional view on the line III—III of Fig. 1.

Figure 1:
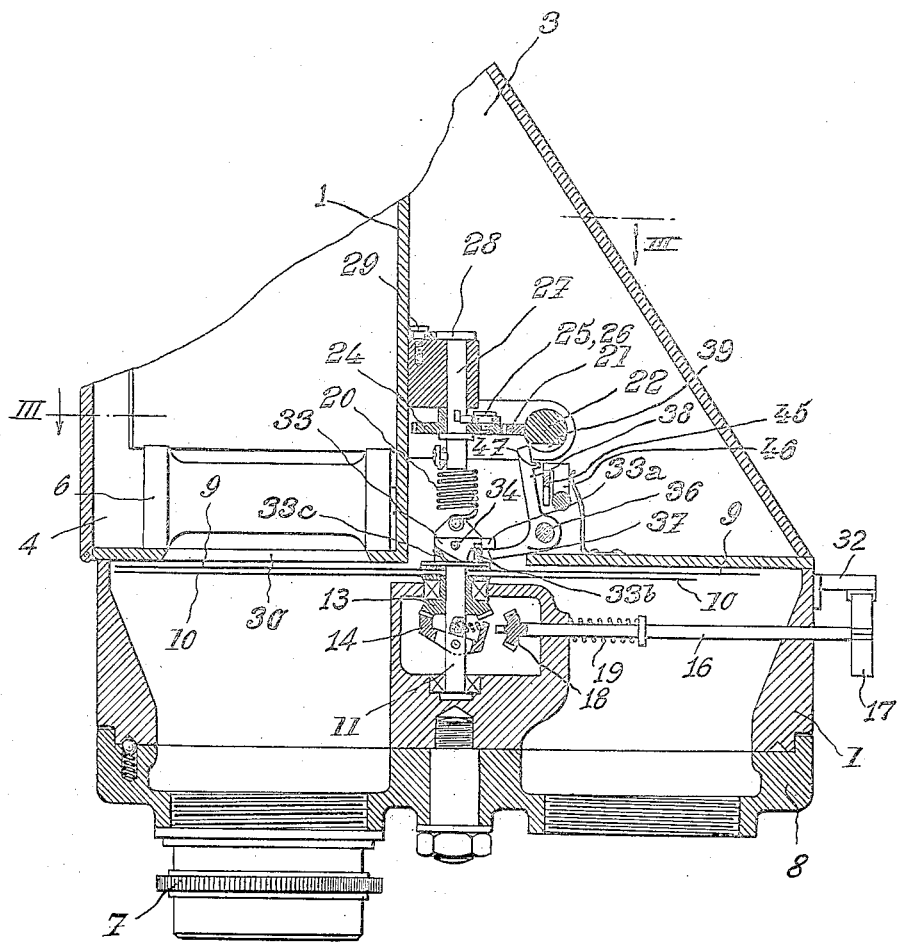
Fig. 1 is a transverse sectional view of a photographic camera made according to the present invention.

In the drawing, reference character 1 (Figs. 1 to 3) designates the casing of the photographic camera, which is provided with a handle 2. On the inside of this casing, there is a chamber 3 which contains the means for releasing and setting the shutter. This shutter is supposed, in this embodiment, to be of the focal plane type, that is to say of the type in which the movable parts, intended to control the passage of the light rays to the sensitized surface, move very close to this surface.

A second chamber 4 is provided in casing 1 so as to contain the magazines 5 and 5' in which the film is wound and unwound before and after exposure, respectively. Furthermore, drums or spools 6 are provided for the driving and the guiding of the film.

The optical system of the photographic apparatus includes several lenses of different respective focal lengths, these lenses being mounted in a conventional manner on a pivoting support 8 in such manner that it is possible to use at will either of these lenses.

The shutter of the photographic camera includes two sector-shaped blades 9 and 10, which are mounted on a pivot 11 located on the outside of aperture 30. These blades 9 and 10 form between them a sector-shaped slot the edges of which are constituted by the edges 12 of said blades. The width of the slot is adjustable by relative displacement of blades 9 and 10.

Means are provided for imparting a rotary movement to the whole of these two blades, while permitting the adjustment of their initial relative positions.

For instance, one of said blades, say 9, is fixed rigidly to said spindle 11, which can be given a revolving movement about its axis from a driving and release system, for instance of the kind that will be hereinafter described.

The other blade 10 is mounted coaxially with the first one, on a movable support such as a pinion 13, which will be hereinafter referred to, adapted to be coupled with spindle 11 through means such as a comb-like part 14, keyed on said spindle and normally kept by a spring 15 in a position such that it meshes with said pinion.

Finally, in order to permit an adjustment by rotating the two blades relatively to each other, I make use advantageously of means permitting, through a single movement, of uncoupling blades 9 and 10, and of imparting the necessary relative rotary movement to said blade 10.

These last mentioned means consist for instance of an operating rod 16 (Fig. 1) provided, at one end, with an operating knob 17, provided with graduations corresponding to times of exposure, and, at the other end, with a bevel pinion 18 capable, when rod 16 is pushed against the action of a spring 19, on the one hand of coming into mesh with pinion 13, and on the other hand of producing the disengagement of comb-like member 14.

The whole is preferably devised in such manner that knob 17 can be turned only when it is so pushed against the action of spring 19. To this effect, for instance, knob 17 can be provided with notches coacting with a pointer 32 in such manner that the latter is disengaged from said notches only when said rod is so pushed.

It will be readily understood that it is thus possible, by turning knob 17, after having pushed it against the action of spring 19, to modify the relative position of blade 10 with respect to blade 9 and therefore the aperture of slot 12, which permits of adjusting in an accurate manner the time of exposure without having to modify the rate of movement of blades 9 and 10. When rod 16 comes back to its initial position, the two blades are again made rigid with each other.

In order to permit of actuating pivot 11 together with the blades, in the course of an exposure, a spring is provided which can produce, after the release, a rotation of 360° of pivot 11, which causes slot 12 to pass in front of the aperture. The driving spring consists preferably of a helical spring 20, which is coaxial with pivot 11 and which is previously tensioned by twisting. Spring 20 acts at one end on pivot 11, whereas it is connected, at its other end, with a setting device.

This setting device includes a rack 21 which is connected to a rod 22, which can be actuated by means of a handle 23. The rack is in mesh with a pinion 24. The latter drives, through a ratchet mechanism 25—26 or the like, a spindle 27 in a given direction. This spindle is coaxial with pivot 11 and it is fixed to the upper end of spring 20. Furthermore, a pawl mechanism 28—29 is combined with spindle 27, in such manner that is possible to bring back rack 22 and the corresponding pinion to their initial positions, after setting, without again actuating the spindle 27.

Rod 22 serves also to ensure the displacement of the film after the taking of each picture. For this purpose, rod 22 is provided with a second series of teeth 49 which can drive spool 6 by means of a pinion 50 in any conventional manner. The means for driving spool 6 are preferably arranged in such manner that the setting of the shutter takes place for instance during the forward movement of rod 22 and that the displacement of the film takes place during the backward movement of said rod.

The device for releasing the shutter includes a pawl 33 or the like, which can turn about a spindle 34 carried by pivot 11. When the shutter is in the position of rest, a finger 33a of pawl 33 penetrates into a groove provided in a stationary abutment 33b. The engagement of finger 33a with the groove 33b is ensured by a spring 33c.

The release of pawl 33 is obtained by means of a bent lever 37 which is pivotally mounted about a pin or axis 36. One of the ends of the bent lever is located below finger 33a. For the release of the shutter, pin 36 is turned together with lever 37, in such manner that finger 33a comes outside of the groove provided in the abutment 33b. Consequently, spring 20 expands, driving pivot 11 together with itself. When this rotation movement is finished, finger 33a penetrates again into the groove of abutment 33b in such manner that a new rotation cannot take place as long as the shutter has not been again released.

According to a feature of the present invention I provide means for mechanically engaging or locking rod 22, which serves both to the setting and to the displacement of the film, with the shutter release device. These locking means permit of avoiding the release of the shutter as long as the film has not been displaced and spring 20 has not been again tensioned. On the other hand, owing to said means, it is not possible to displace this film any longer as long as the shutter has not been again released.

In order to prevent the shutter from being released when rod 22 is not at the end of its inward stroke, that is to say in a position such as that shown by Fig. 2, the release lever 37 is provided with an arm 38 which comes to abut against rod 22, preventing the release when said rod 22 is in a position different from that above mentioned.

This rod 22 includes a groove 39 which, in the above mentioned position shown by Fig. 2, is located opposite arm 38, in such manner that, in this position, this arm 38 can penetrate into groove 39, which therefore permits of releasing the shutter.

In order to lock rod 22 at the end of its backward movement, a swinging member 40 is provided, one of the branches 41 of which, constituted by a spring blade 41, can act as abutment for a ring 42 carried by rod 22, in the locking position of said swinging member. The whole is brought into said locking position during the operation of setting the shutter (forward movement of rod 22). For this purpose, the other branch of the swinging member is, for instance, provided with an inclined surface 43 which coacts with ring 42 and rod 22 during the forward movement of the latter, thus producing a lowering of the swinging member, and also the locking of the end 45 thereof under pawl 46, as shown by Fig. 1.

This locking position of the swinging member remains during the return movement of rod 22. In the course of this movement, ring 42 moves past blade 41, the latter being depressed downwardly owing to its elasticity. But after the ring has been caused to slide over the free end of said blade, the latter opposes the return movement of rod 42 as long as the swinging member has not been released, at 45, from the action of pawl 46. This release is obtained by the actuation of the release means, the arm 38 of which lowers the pawl 46 by means of finger 47. The swinging member then returns into its unlocking position under the effect of a spring 48.

I thus obtain, in the manner above described, engagements or lockings which prevent, on the one hand, the displacement of the film before the shutter has been released, and the other hand the release of the shutter before a new length of film has been brought in front of the lens. Finally, it is also made impossible to actuate the shutter without having displaced the film, since it is then necessary to set the system once more.

In a general manner, while I have, in the above description, disclosed what I deem to be a practical and efficient embodiment of the present invention, it should be well understood that I do not wish to be limited thereto as there might be changes made in the arrangement, disposition and form of the parts without departing from the principle of the present invention as comprehended within the scope of the appended claims.

The present application is a division from my prior patent application Serial No. 138,254, filed April 21, 1937.

What I claim is:

1. A photographic camera which comprises, in combination, a lens, means for intermittently feeding a photographic film in the field of said lens, shutter structure for controlling the light between said lens and the film, means to exert a tension on said shutter structure, a movable member, means operated by movement of said member to operate said film feeding and tension exerting means, means to hold said shutter structure against actuation by tension, means to release said holding means including a lever movable towards said movable member, said movable member having a notch therein engageable by said lever to permit actuation of said release means when said movable member is in such position that said notch is opposite said lever, locking means for holding said movable member in such position, means to hold said locking means in locking position, means urging said locking means away from locking position, and means operated by movement of said lever into said notch to release said last holding means, whereby said locking means releases said movable member.

2. A photographic camera which comprises, in combination, a lens, means for intermittently feeding a photographic film in the field of said lens, shutter structure for controlling the light between said lens and the film, means to set such shutter structure, a reciprocable control member movable from and to a given position for operating said setting means and operating said film-feeding means, a locking device for said control member mounted for oscillation between a position in which it automatically locks said control member in such given position and a position in which it releases said control member, elastic means urging said locking device to said second position, means operative by movement of said control member from such given position for automatically moving said locking device to said locking position, means for holding said locking device in said locking position against the action of said elastic means, means to release said shutter structure, means operated by said shutter structure release means to release said locking device holding means, and means to prevent operation of said shutter structure release means when said control member is out of such given position.

3. A photographic camera according to claim 2 in which said locking device includes a swinging member having two arms one of which is adapted to cooperate with said locking device holding means, a spring for acting on said swinging member, and a lever interposed between said shutter structure and said locking device holding means.

4. A photographic camera according to claim 2 in which the means for moving the locking device to the locking position include an inclined surface carried by the locking device coacting with said control member.

5. A photographic camera according to claim 2 in which said locking device includes an elastic part, whereby said control member, after the return of the locking device to the locking position, can engage with said locking device.

ISAAC KITROSER.